United States Patent [19]

Schmid et al.

[11] 4,123,312

[45] Oct. 31, 1978

[54] APPARATUS FOR PRODUCING COLLAPSIBLE CONTAINERS

[75] Inventors: Günter Schmid, Vevey; Rudolf Jeker, Vouvry, both of Switzerland

[73] Assignee: Automation Industrielle SA, Vouvry, Switzerland

[21] Appl. No.: 771,627

[22] Filed: Feb. 24, 1977

[30] Foreign Application Priority Data

Sep. 24, 1976 [DE] Fed. Rep. of Germany ....... 2643089

[51] Int. Cl.[2] .............................................. B65C 3/12

[52] U.S. Cl. ..................................... 156/466; 93/39.2; 156/69; 156/198; 156/203; 156/250; 156/272; 156/510

[58] Field of Search ............... 156/198, 193, 194, 202, 156/203, 200, 466, 461, 69, 86, 250, 272–274; 93/82, 39.1 R, 39.2, 39.3; 53/290, 291, 292, 296; 264/150, 163

[56] References Cited

U.S. PATENT DOCUMENTS

| | | | |
|---|---|---|---|
| 1,654,871 | 1/1928 | Gage et al. | 156/466 X |
| 2,484,076 | 10/1949 | Collins | 156/466 X |
| 3,388,017 | 6/1968 | Grimsley et al. | 156/498 X |
| 3,399,094 | 8/1968 | Skoggard et al. | 156/203 X |
| 3,495,504 | 2/1970 | Sloan | 93/39.1 R X |
| 3,575,769 | 4/1971 | Radzio | 156/203 X |
| 3,631,509 | 3/1953 | Whytlaw | 156/203 |
| 3,700,513 | 10/1972 | Haberhauer | 156/203 X |
| 3,739,129 | 6/1973 | Miller | 156/203 X |
| 3,777,632 | 12/1973 | Pepmeier | 156/203 X |
| 3,851,568 | 12/1974 | Holoubek et al. | 93/39 C X |
| 4,016,704 | 4/1977 | Fujio et al. | 156/86 X |

*Primary Examiner*—David A. Simmons
*Attorney, Agent, or Firm*—Paul J. Cook

[57] ABSTRACT

Apparatus for forming containers having a deformable tube and a closing cap attached to one end of the tube. A strip of deformable material is fed through a shaping tube and a mandrel axially positioned within the forming tube by means of an endless belt positioned within the mandrel and another endless belt positioned exterior of the mandrel. Welding means are provided to join the overlapped edges of the deformable material that has been shaped into a cylinder. Cutting means downstream of the welding means segment the welded cylinder into cylindrical tubes of desired length. A tube head is molded onto one end of each cylindrical tube.

8 Claims, 13 Drawing Figures

3 8 7 5 9 11 12' 15 16 12' 23 14 12 10 17 17 12' 17 12 6 17

1
2
3
4
5
6
9
11
12'
14
15
16
18
20
21
22
24
27
28
30
31
32

12
14
12
9
10
VII
VII
5
12'
8
6
3

12'
11
12
13
10
17

25
24
27
26
19
19
18
20
3

27
23
25
25
26
26
18
20
3

31
32
23
33
34
35
36
37
I
II
III
IV
V
VI
VII
VIII
XI
X

APPARATUS FOR PRODUCING COLLAPSIBLE CONTAINERS

BACKGROUND OF THE INVENTION

The invention relates to an apparatus for producing collapsible containers with a deformable tubular body formed of a thermoplastic foil strip and a closing cap. The apparatus includes a continuously moving feed device for a laminated strip, a two-stage shaping device with a shaping tube and a mandrel and continuously driven transport belts, a welding unit, cooling device which may include means for supplying air into the shaping device for reducing friction, a cutting device, a continuously operating transporting device, and spindles which are arranged on a turntable and can be supplied to processing stations, for connecting the foil tubes produced with the closing caps.

Apparatus for forming tubes are described in U.S. Pat. Nos. 3,388,017 and 3,778,321. U.S. Pat. No. 3,388,017 describes an apparatus for producing tubular bodies of a thermoplastic strip material wherein the strip material is carried on a driven conveying belt having a smaller breadth than the strip material. The strip material is introduced jointly with the belt into a split shaping tube which is open at the top. Furthermore, two driven belts are provided of which one is guided in grooves in the mandrel and the other is so arranged that the overlapping parts of the tube strip are guided during passage through the shaping body so as to be clamped by the action of pressure by means of the two belts. Heat transfer when welding the seam is ensured by contact heating which is brought about by virtue of heating acting through the transport belt onto the foil.

This apparatus has the following disadvantages: The strip to be welded is introduced into the shaping body by a conveying belt, and this belt makes the apparatus as a whole more complicated and in this respect it is necessary to ensure that the conveying belt is always so guided that it does not in any case come into the lap zone of the tube strip, since this causes misfunction and impairment of the quality of the tube strip produced. In the case of a known apparatus this is achieved by preshaping the strip with a guide roller on the one hand and by the further feature that the passage opening of the shaping block has two different diameters, that is to say on the one hand only for the passage of the tube strip and on the other hand for the passage of the tube strip and the conveying belt and therefore in the abutting zone lateral recesses have to be provided in the cross-section which give the conveyer belt some lateral play. Furthermore, for this purpose, guide rollers have to be provided at the bottom.

Furthermore, as a heat transfer element, the conveyor belt is subjected to extreme thermal loading since the same belt is passed through the welding zone and also through the cooling zone. This leads to the further disadvantage that both the transfer of heat and also the removal of it can only be indirect, that is to say through the conveyor belt.

All these features render the apparatus extremely complicated and owing to the necessary recesses and spaces allowing for play of the belts, it is not possible to produce any exactly round cross-section of the tube body even at positions remote from the joint seam and accordingly the shape of the tube body and therefore its final appearance are impaired. Furthermore, the conveyor belt is continuously deformed in various directions by the guide rollers and the shaping to produce half a tube and it is caused to slide on the shaping block so that it is subject to rapid wear and must often be replaced, something which leads to substantial losses in production time.

Furthermore, heating by contact offers a relatively low efficiency and this in turn results in limitations in the speed of operation. The action of heating by contact depends upon the engagement area, that is to say on the foil and it is difficult to check and leads to substantial tolerances.

Since each of the three conveyer belts must be driven separately and, in the case of the necessarily elastic construction of the belts absolutely synchronous drive is not possible, additional difficulties occur, which reduce the quality of the tube bodies produced. The result of all these difficulties taken together is that such forms of apparatus have not become accepted in the tube making machine market.

U.S. Pat. No. 3,778,321 describes an apparatus for producing collapsible containers having a turntable with several rotary spindles, which can be supplied to different processing stations. A foil strip is wound up on to a spindle with overlap, cut off and longitudinally welded or, respectively, bonded and one end is so folded that a closure cap can be mounted on it, which is fixed in position by welding or bonding.

In the case of this apparatus, substantial difficulties arise as regards ensuring a straight cut edge, even overlap and production of blanks with a constant diameter and with a weld seam of constant shape. Furthermore, the production of the head part by folding, donning and joining a closure cap is very elaborate and ultimately leads to a poor appearance of the joint, more particularly if the latter is welded, so that this apparatus has never come into use for industrial tube production. Furthermore, with this apparatus it is not possible to produce on a large scale since the rolling up, cutting off and welding oerations have to be carried out one after the other in definite stages on one spindle.

In accordance with a further proposal, closure heads were to be produced on the tube bodies by injection molding, something which leads to the well-known disadvantages which can occur in the case of periodic injection molding and furthermore this leads to low output speeds of the apparatus as a whole.

SUMMARY OF THE INVENTION

The aim of the invention is that of avoiding the disadvantages inherent in the known forms of apparatus and creating an apparatus for the continous production of collapsible containers which is simple and compact in construction and produces automatically complete containers provided with closure caps so that the apparatus can also be used in factories producing the materials actually to be packed in the tubes. Furthermore, the containers are capable of being produced in stepwise adjustable length. The apparatus is capable of processing both printed and also unprinted foil material and it has a high output capacity and is capable of producing containers with neat weld seams and with a pleasing appearance.

A further significant air of the invention is that of ensuring a constantly high speed of operation and economic production of the containers to be filled.

In the case of an apparatus of the initially mentioned type, this aim is to be achieved by the invention in that in the two-stage shaping device both the mandrel and also the shaping tube have an uninterrupted form and advance of the material used to form the tube is brought about continuously by means of a driven belt arranged adjacent the welding unit cooperating with a driving roller for the belt so that the belt frictionally entrains the shaped or molded foil tube. A second belt is arranged in the interior and at the rear end of the mandrel and runs over freely rotatable rollers and serves to assist positioning the foil tube during welding and subsequent cooling. After the welding and cooling of the tube, it is compressed by being passed through a squeeze roller and a cutting device, including a transverse cutter provided with register control means. After cutting, the tube sections are passed through an adjustable receiving and transport device to restore the cylindrical tube shape. A feed device for the welded tube sections positions them onto spindles and means are provided which connect tube heads with the foil tube so that the foil tube of the finished container overlaps the head of the container. Processing stations are provided for heating the shoulder zone for molding on and welding on the tube heads under pressure and for cooling and detaching the tubes from the spindles and for discharge.

BRIEF DESCRIPTION OF THE DRAWINGS

In what follows the invention will be described with reference to a preferred embodiment referring to the drawings.

DETAILED DESCRIPTION OF SPECIFIC EMBODIMENTS

Figures 1, 2:
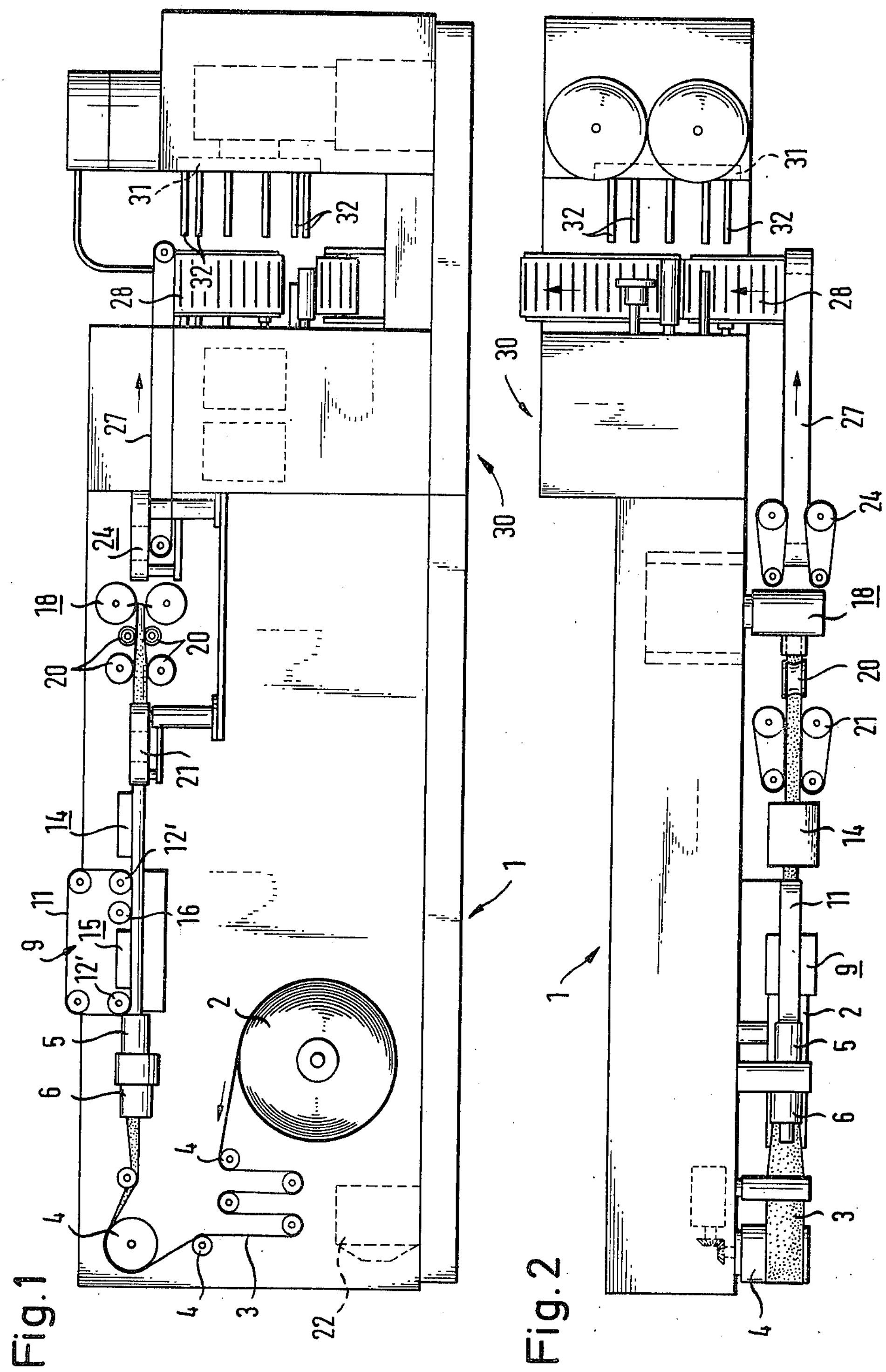
FIG. 1 is an overall side view of the apparatus in accordance with the invention.
FIG. 2 is a plan view of the apparatus of FIG. 1.
Figure 3:
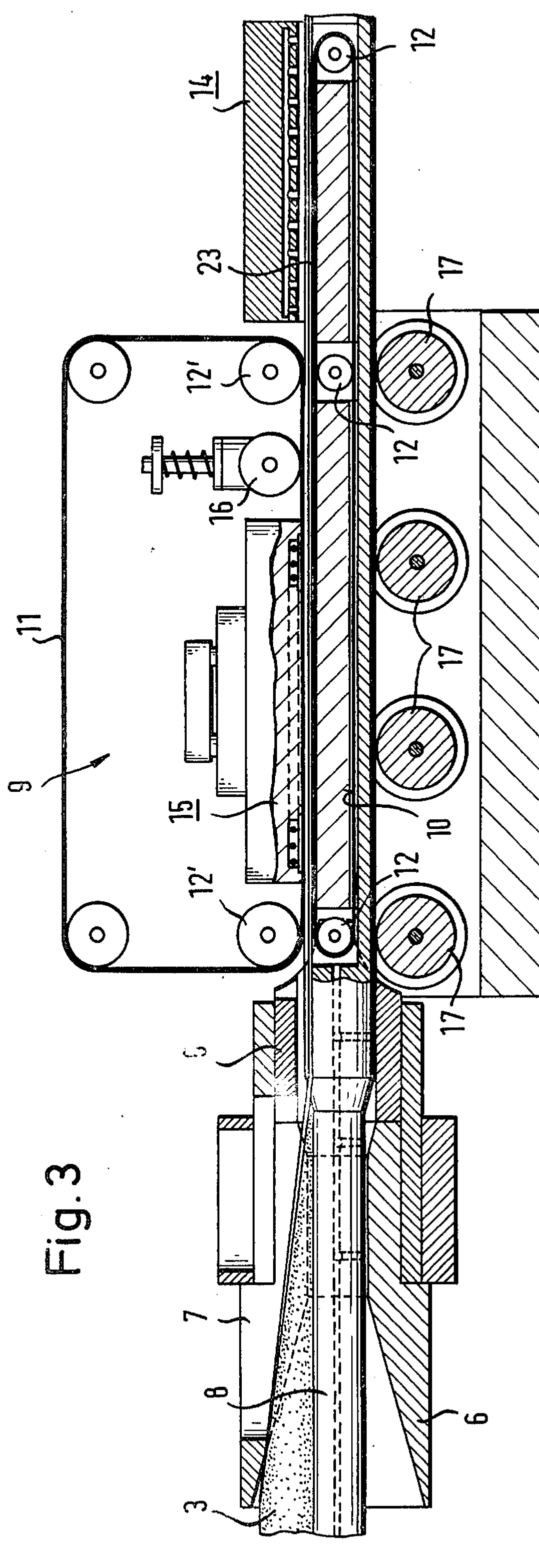
FIG. 3 is a longitudinal section taken vertically through the shaping, welding and cooling device of FIG. 1.
Figure 5:
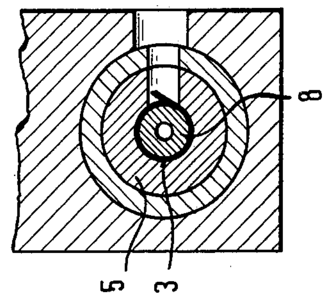
FIG. 5 is a section on the line V—V of FIG. 4.
Figure 4:
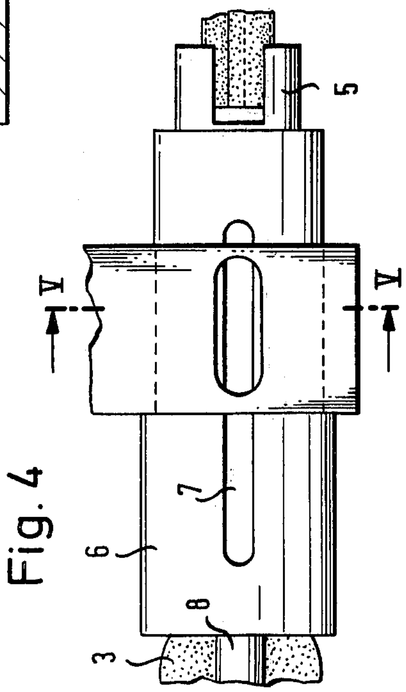
FIG. 4 is a plan view of the shaping device shown in FIG. 1.
Figure 6:
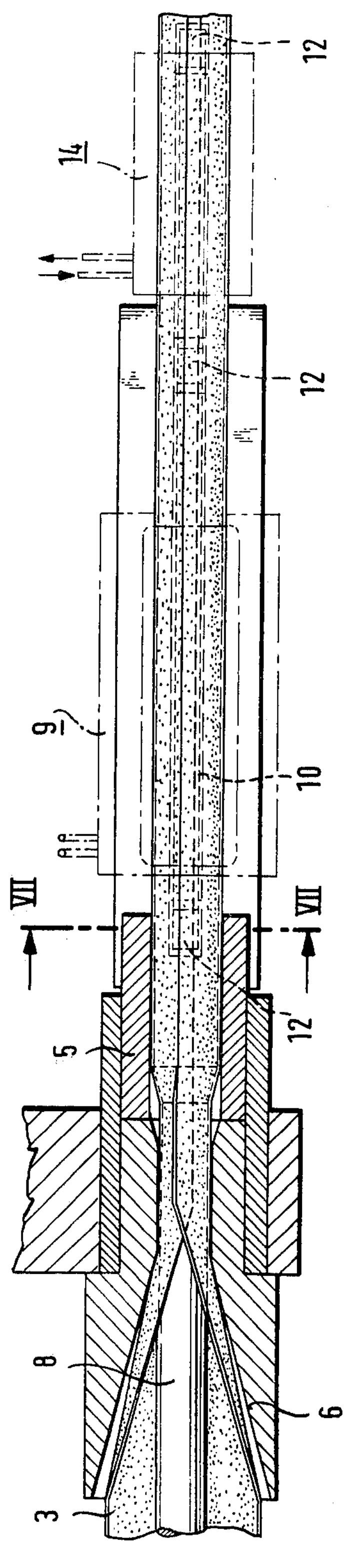
FIG. 6 is a horizontal longitudinal section through the shaping, welding and cooling device of FIG. 1.
Figure 7:
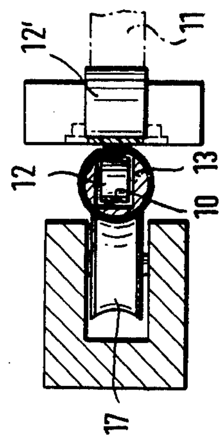
FIG. 7 is a section on the line VII—VII of FIG. 6.
Figure 8:
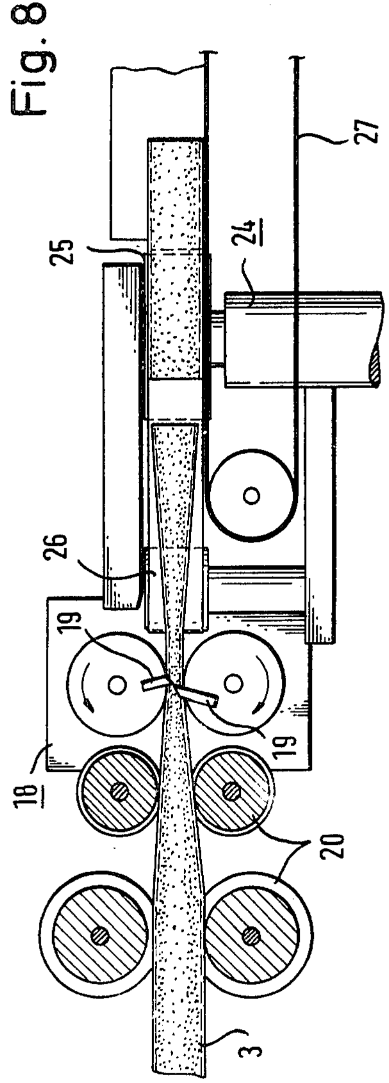
FIG. 8 is an elevational view of a device for flattening the tubular body, the cutting device and a device for restoring the round cross-section.
Figure 9:
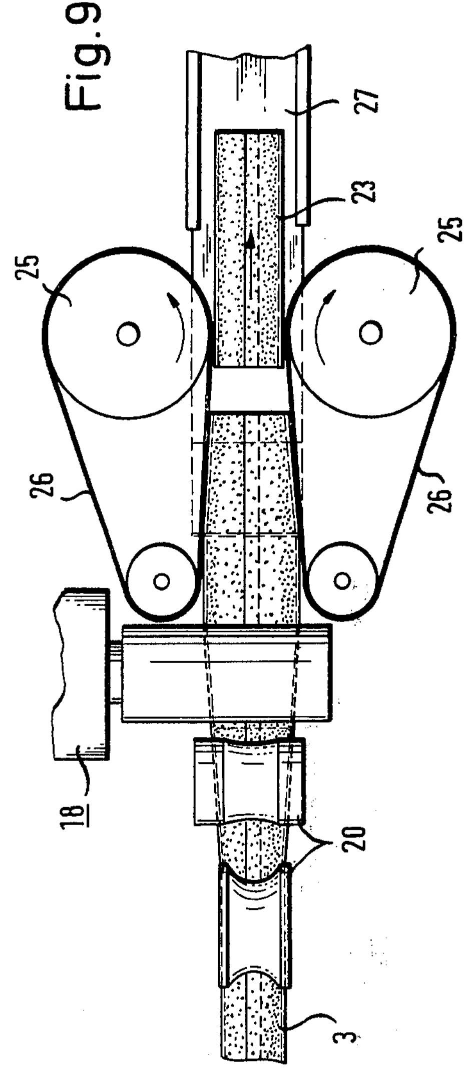
FIG. 9 is a plan view of the same devices of FIG. 8.
Figure 10:
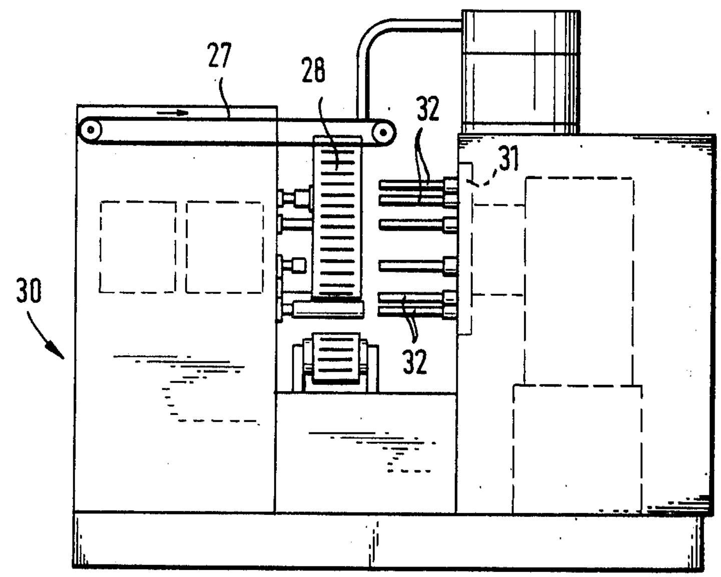
FIG. 10 is an elevational view of the heading machine and the supply device.
Figure 11:
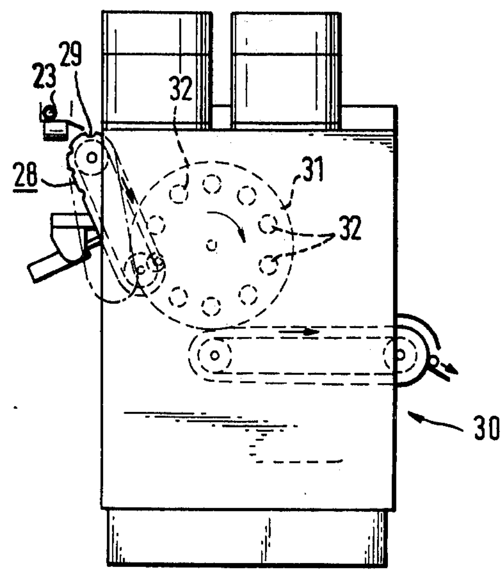
FIG. 11 is an end view of the devices of FIG. 10.

The apparatus in accordance with the invention for the production of collapsible containers has a shaping device 1. The foil strip 3, supplied from a foil reel 2, and for example in the form of aluminum foil coated on both sides with polyethylene, is supplied via guiding and equalizing rollers 4 to a shaping tube 5. The shaping tube 5 has a guide-in trumpet 6 and a guide slot 7 made in the trumpet 6. One wall of the guide slot 7 serves for guiding one side edge of the supplied foil strip 3 and accordingly simultaneously for directional setting of the position of the overlap of the two side edges of the foil strip 3.

From the feed-in trumpet 6, the preshaped foil strip passes into the shaping tube 5 in the strict sense, which has a cylindrical shape. In the inlet opening there extends a conically tapering mandrel 8. The cross-section of the guide-in trumpet 6 and the cross-section of the mandrel 8 is initially smaller than the eventual final cross-section of the tube body 23 after welding. Following this the tubular body, resembling a hose, is pressed to the required dimensions. In the embodiment described the hose-like tube is widened. The internal cross-section of the shaping tube 5 and the outer cross-section of the mandrel 8 are suitably selected in accordance with the degree of widening or reduction respectively to be carried out so that they provide a two-stage construction.

After the final shaping, the formed tube passes into the high-frequency welding unit 9. On passing into the high-frequency welding unit 9, having a cross-section corresponding to the end stage of the shaping tube 5, the overlapping foil edges of the tube so formed pass between two conveyer belts 10 and 11. The high-frequency welding carried out causes the welding heat to be developed in the foil directly so that transfer elements are not necessary.

The one conveyer belt 10 is so arranged in the interior of the mandrel 8 on rolls 12, freely running in the mandrel 8, in a groove 13 in the mandrel 8 so that the upper edge of the top conveyer belt 10 completes the peripheral line of the mandrel surface and the lower edge of the lower circulating conveyor belt 10 runs in the interior of the mandrel 8. The conveyor belt 11 is so arranged in a groove in the welding unit 9 that it lies on the outer surface of the lap joint of the formed tube. This ensures that the lapping edges of the foil strip remain pressed against each other so that the dimensions of the preshaped tube are not changed.

The conveyor belt 11 is driven via a driven roller 12'. The roller 12' is so arranged with respect to a freely rotatable roller 12 in the mandrel 8 that by virtue of the roller 12', the conveyor belt 11, extending over it, by friction with the enclosure of the mutually lapping edges of the strip foil, the movement is transferred to the belt 10 mounted on the freely rotating rollers 12. The result of this is a synchronous or in-step movement of the two belts 11 and 10, which guide and grip between them the lapped edges and, as a result, there is no possibility of sliding of the upper or lower belt on the tube seam, thereby improving the dimensional stability of the tubular shape formed. The internal conveyor belt 10 guarantees this function not only in the welding unit 9, but also in the cooling device 14 coming after the welding unit 9 so that the tubular body seam is not subjected to any mechanical stresses while it is still hot, for example as might be occasioned by friction.

The upper conveyer belt 11 is so guided that the welding device 15 is arranged adjacent to the middle of the lower belt run. In the case of laminated or compound foils, it is advantageous to use a high-frequency induction heating system while for mono-foils, an ultrasonic welding device can be used. In the overlapping zone the welding device 15 ensures a temperature gradient which continuously rises in the direction of movement. Heating is carried out to such an extent that at the end of the welding device 15, flowing phases are present in the lap zone of the foil edges.

The temperature level at the outlet end of the welding device 15 can be freely selected in accordance with the foil material and is held at a certain value and for this purpose, conventional sensors or pick-ups and regulating devices can be employed.

Following the welding device 15, a squeeze roller 16 is arranged for pressing out the flowing or liquid phase of the foil. This roller 16 presses from above on to the conveyor belt 11 and thus on to the lapping edges. Owing to this pressing out flowing phase the edges of the metal foil are sealed together internally and externally and there is also a complete bonding of the lapped foil edges. The tube after welding now passes from the welding device 15 into the cooling device 14, in which it is only guided and held in the desired dimensional configuration by the conveyor belt 10 alone or together with specially shaped rollers 17 arranged on both sides of the tube. The cooling device 14 brings about the direct action of the cooling effect on the heated foil part in order immediately to ensure that the seam is stabilized in its shape.

In order to cool the conveyor belt 10 and for improving the ease of sliding of the foil in the shaping tube as well in the mandrel 8 and possibly also in the wall of the shaping tube 5 and in the welding unit 9, openings or nozzles are provided for introducing air. If cooling by the surrounding air should not be sufficient, it is also possible to provide a blower and possibly a cooling unit adjacent to the welding zone. After passing through this cooling structure, the shaped endless tube passes into the cutting device 18.

The cutting device 18 consists of two knives 19 rotating without play. The peripheral speed can be so regulated irregularly in accordance with the length to be cut that at the time of cutting, the speed of the knives 19 is the same as that of the tube formed.

In order to provide a further increase in the neatness and linearity of the cut, the shaped tube 23 can be given an oval cross-section by rollers 20, that is to say it is flattened. The longer side of the tube 23 lies parallel to the cutting edges of the knives 19.

A change in the length of the cut-off tubular bodies can be set by virtue of a regulated change speed drive 22 arranged between the advance drive 21 and the cutting device 18, the knives 19 playing a determinative role in keeping the structure in step.

With the apparatus in accordance with the invention, it is possible to produce up to 80 or more tubular bodies per minute in accordance with the specific length of the bodies.

From the cutting device 18, the cut-off tubular bodies 23 pass into a device 24 for restoring the circular cross-section. It consists of two endless belts 26 running around rollers 25 having different diameters and running towards each other conically in the direction of movement. The device 24 is arranged adjustably in such a manner so that the tubular bodies 23 are engaged by the belts 26 at that instant at which cutting occurs and at the downstream end so that the clearance distance between the two rear rollers 25 and the belts 26 is somewhat less than the respective diameter of the round tubular body 23 so that on passage through the respective cross-section has a slightly oval shape in a vertical direction. Owing to the release of the elastic foil material, the desired circular shape automatically becomes established after the material leaves the device.

The cut-off tubular bodies 23 are transported via a transport belt 27 on to a feed belt 28 and pass one after the other in the feed troughs 29 to the heading machine 30. The heading machine 30 comprises a vertically arranged turntable 31 with rotary spindles 32 arranged vertically on it. The spindles 32 are arranged evenly on one radius on the turntable 31 with even spacing between them. Opposite each spindle 32 there are respective processing stations, feed or discharge stations.

Before a spindle 32 comes into a position opposite the supply trough 29, a cap head 33 is placed on its end. On further rotation of the table through one step the spindle 32, provided with the cap head, comes into the position opposite the supply trough 29. By means of a feeling device or a photoelectric detector or the like, the spindle 32 is examined to see if it carries a cap head 33. If the spindle 32 carries a cap head, a tubular body 23 is pushed on to the spindle 32 over the shoulder 34 of the cap head 33. If, however, no cap head 33 is placed on it, the supply trough 29 is swung out of position and the tubular body is ejected from the heading machine.

Figure 12:
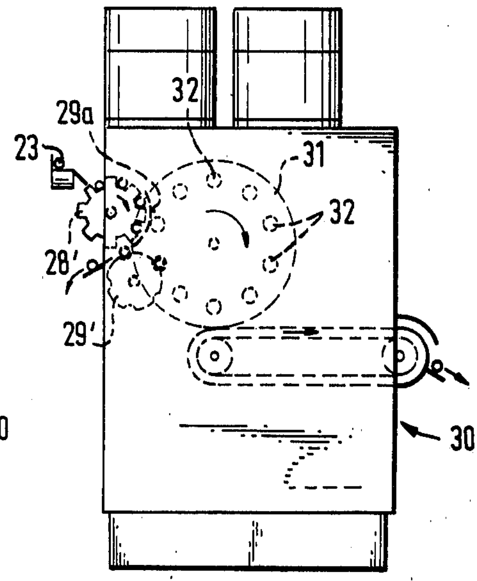
FIG. 12 shows a further embodiment of the supply device.

Another form (see FIG. 12) of transfer can be carried out in which the cut-off tube bodies 23 are passed via the transport belt 27 to a transfer roller 28' from which they are passed via a vacuum drum 29' to the heading machine 30. Between the transfer roller 28' and the vacuum drum 29' there is a sheet metal shaping member *29a* which can be pivoted around the transfer roller 28' and which by pivoting inwards prevents transfer from the transfer roller 28' to the vacuum pump 29' in such a manner that the tubular body 23 does not pass into the heading machine. This always occurs if suitable measures, see above, have determined that this tubular body 23 on transfer from the vacuum drum 29' to a spindle would come on to a spindle 32 on which there is no cap head 33.

Figure 13:
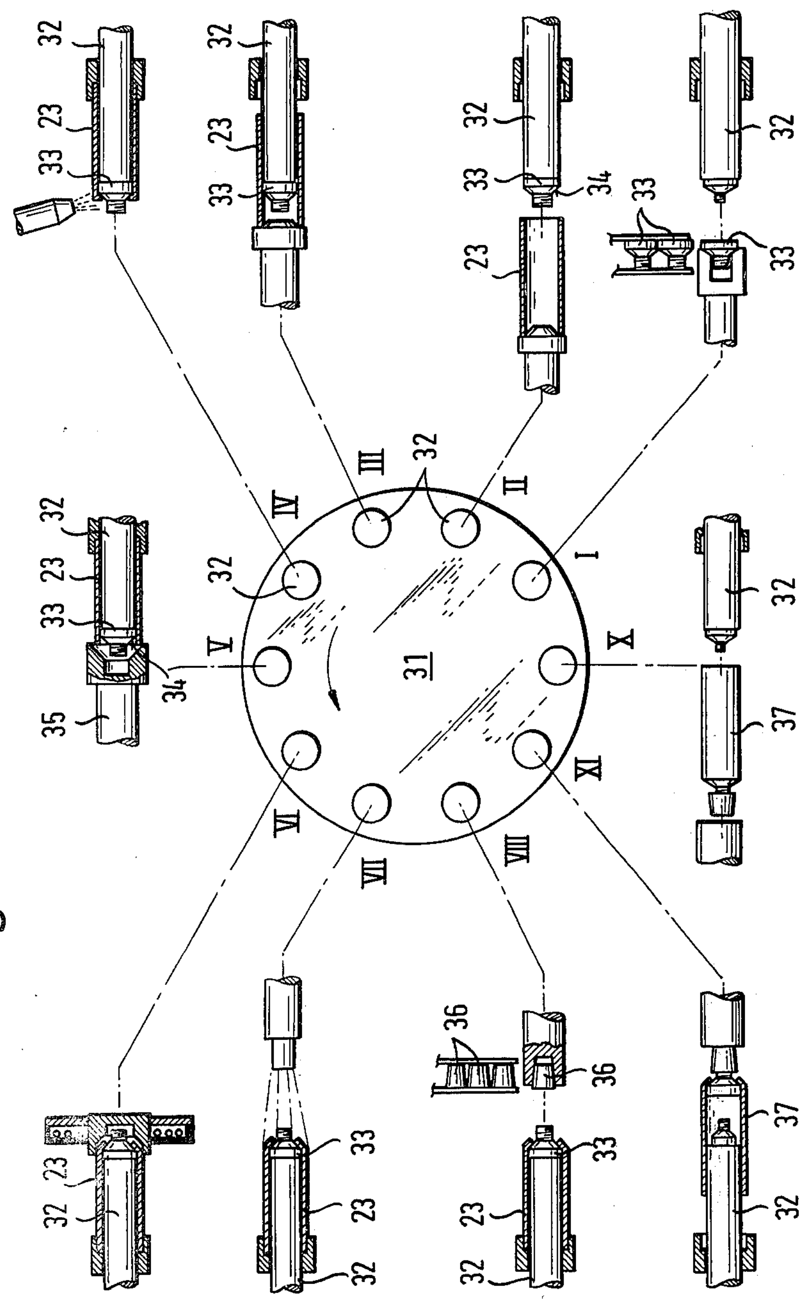
FIG. 13 shows the individual working stations of the heading machine.

Referring to FIG. 13, after the tubular body 23 has been pushed on to a spindle 32, it is positioned after further rotation through one step on the cap head 33 in such a manner that the end of the tubular body 23 still extends somewhat beyond the edge of the shoulder 34 of the cap head 33.

In the next processing station the shoulder zone of the cap head 33 and the projecting edge of the tubular body 23 are heated by hot or warm air, the spindle 32 being turned in order to achieve even heating.

In the following processing station, the projecting end of the tubular body 23 is shaped by means of a shaping piece 35 onto the shoulder 34 of the cap head 33, the spindle 32 being turned again.

In the following processing station, the cap head 33 is welded by induction welding with a slight pressure to the shaped end of the tubular body 23. Owing to the pressure, the flowing phase formed is squeezed out and seals the outer edge of the metal foil in a manner similar to sealing taking place during formation of the tube.

In the following processing stations, firstly the cap head 33 is cooled, for example, by means of a blower, and then a closure cap 36 is screwed in position and finally detachment of the finished containers 37 from the spindles 32 is ensured by blowing in air and in the last station of all discharge occurs.

The finished containers can then be supplied directly to a filling station. The containers are sealed after filling such as by being crimped at the end opposing the end to which the cap is attached. For adapting the apparatus to suit different diameters of containers, the mandrel 8, the shaping tube 5 and the spindles 32 can be interchanged.

If the foil strip 3 is already printed, it will be necessary to undertake a slight correction in the length of cut occasionally if the printed matter comes too close to one end of the tubular body so that as a result in the finished and filled container it either lies at the edge of the head cap or it is covered up in the closure at the other end.

In the apparatus in accordance with the invention, which has a adjustable change speed gear 22, the length of cut, that is to say the speed of advance is adjusted. In order to make possible a correction, however, an oversize dimension is set. For example, if the nominal size amounts to 120, an oversize of approximately 0.2 is provided, that is to say the overall dimension is 120.2. The oversize set must correspond to the defects to be expected. The oversize must consequently be larger than the tolerance existing. If an error is produced, it is only necessary to provide a correction in one direction. For this purpose, the advance with respect to the knives is slowed up, that is to say actually the advance is checked. The slowing down or stopping of the advance is not brought about suddenly, because the control device bringing about the correction comprises an overtaking transmission with a large ratio, for example 1:343.

It is to be understood that the present invention is not limited to the embodiments specifically described, but that it includes modifications which will be evident to the person skilled in the art.

We claim:

1. Apparatus for forming containers having a deformable tubular body and a closing cap attached to one end of said tubular body which comprises:

a. feeding means for feeding a strip of deformable material through a two step shaping means comprising a shaping tube and a mandrel axially positioned partially within said tube to shape said material into a cylinder having overlapping edges, at least a portion of said shaping tube upstream of a welding means being closed in the peripheral direction, said feeding means including a first endless belt positioned within said mandrel and a second endless driven belt positioned exterior of said mandrel, b. means for moving said first and second endless belt to frictionally contact and move said shaped material along said mandrel said shaped material and first endless belt being moved solely by said second belt and friction from said second belt to said first belt via said material said second belt being the sole means for moving said shaped material in said feeding means, c. said welding means comprising high frequency induction means or ultrasonic means adjacent said mandrel adapted to heat said overlapping edges while moving said material along said mandrel, d. pressing means adjacent said welding means adapted to press the flowing or liquid heated phase of said shaped material to seal the edges of the shaped material internally and externally, e. cooling means adjacent said pressing means to set said flowing or liquid phase, f. cutting means comprising two mating rotated knives adjacent and downstream of said mandrel adapted to segment said closed cylinder into cylindrical tubes of desired length, and g. means adjacent said cutting means for welding a tube head to one end of each of said cylindrical tubes comprising a high frequency induction means or an ultrasonic means utilized to weld overlapping portions of said tube and said head.

2. Apparatus in accordance with claim 1 wherein said cutting means includes a first pair of mating rollers for deforming said closed cylinder, a pair of knife edges mounted on a second pair of rollers to cut said deformed closed cylinder and a third pair of endless belts adapted to reform each of said cylindrical tubes into a cylindrical shape.

3. Apparatus in accordance with claim 1, characterized in that the shaping tube has a guide slot adjacent to a guide-in trumpet.

4. Apparatus in accordance with claim 2, characterized in that the third pair of endless belts and the knife edges include a regulated change speed drive.

5. Apparatus in accordance with claim 2, characterized in that the third pair of endless belts for reforming the cylindrical tubular shape are coordinated to engage the foil tube at the instant of cutting.

6. Apparatus in accordance with claim 1 includes a fine correction means for adapting the length of cut to printed matter.

7. Apparatus in accordance with claim 1, characterized in that the welding is effected by high frequency induction.

8. Apparatus in accordance with claim 1, characterized in that welding is effected by ultrasonic heating.

* * * * *